US012391097B2

(12) United States Patent
Sun et al.

(10) Patent No.: US 12,391,097 B2
(45) Date of Patent: Aug. 19, 2025

(54) TRANSPORT REFRIGERATION SYSTEM AND METHOD OF OPERATING

(71) Applicant: CARRIER CORPORATION, Palm Beach Gardens, FL (US)

(72) Inventors: Jian Sun, Fayetteville, NY (US); Mark J. Perkovich, Fayetteville, NY (US); Mary D. Saroka, Syracuse, NY (US); Jason R. Kondrk, Clay, NY (US)

(73) Assignee: CARRIER CORPORATION, Palm Beach Gardens, FL (US)

(*) Notice: Subject to any disclaimer, the term of this patent is extended or adjusted under 35 U.S.C. 154(b) by 722 days.

(21) Appl. No.: 15/770,949

(22) PCT Filed: Oct. 21, 2016

(86) PCT No.: PCT/US2016/058048
§ 371 (c)(1),
(2) Date: Apr. 25, 2018

(87) PCT Pub. No.: WO2017/078942
PCT Pub. Date: May 11, 2017

(65) Prior Publication Data
US 2018/0304724 A1 Oct. 25, 2018

Related U.S. Application Data

(60) Provisional application No. 62/250,110, filed on Nov. 3, 2015.

(51) Int. Cl.
*B60H 1/32* (2006.01)
*F25B 49/02* (2006.01)

(52) U.S. Cl.
CPC .......... *B60H 1/3232* (2013.01); *F25B 49/02* (2013.01); *B60H 2001/3238* (2013.01);
(Continued)

(58) Field of Classification Search
CPC ............... B60H 1/3232; B60H 1/3205; B60H 2001/3238; B60H 2001/3275;
(Continued)

(56) References Cited

U.S. PATENT DOCUMENTS 4,667,480 A * 5/1987 Bessler ............... B60H 1/3205
318/254.1
6,487,869 B1 12/2002 Sulc et al.
(Continued)

FOREIGN PATENT DOCUMENTS

CN 2516413 Y 10/2002
CN 101360959 A 2/2009
(Continued)

OTHER PUBLICATIONS

Berg; Future Reefers; Truckinginfo; Copyright © 2015 TruckingInfo. com; Retrieved from Internet Oct. 9, 2015; URL: http://www.truckinginfo.com/article/print/story/2013/01/future-reefers.aspx; 4 pgs.
(Continued)

*Primary Examiner* — Jerry-Daryl Fletcher
*Assistant Examiner* — Daniel C Comings
(74) *Attorney, Agent, or Firm* — CANTOR COLBURN LLP

(57) ABSTRACT

A method of operating a transport refrigeration system is provided. The method includes electrically powering a first plurality of components of a first refrigeration unit and a second plurality of components of a second refrigeration unit, wherein electrically powering comprises operating a prime mover and an electric generation device. The method also includes monitoring a plurality of operating parameters of the first refrigeration unit. The method further includes monitoring a plurality of operating parameters of the second refrigeration unit. The method yet further includes calculating a combined power load of the first refrigeration unit and
(Continued)

the second refrigeration unit. The method also includes comparing the combined power load to a maximum available power of the prime mover.

7 Claims, 3 Drawing Sheets

(52) U.S. Cl.
CPC ............... *B60H 2001/3275* (2013.01); *F25B 2327/001* (2013.01); *F25B 2400/06* (2013.01)

(58) Field of Classification Search
CPC ........... B60H 2001/00928; F25B 49/02; F25B 2327/001; F25B 2400/06; F25B 2500/27
See application file for complete search history.

(56) References Cited

U.S. PATENT DOCUMENTS

| | | | |
|---|---|---|---|
| 7,765,831 B2 | 8/2010 | Rodriguez et al. | |
| 8,756,947 B2 | 6/2014 | Chen et al. | |
| 8,877,274 B2 | 11/2014 | Bell | |
| 9,090,144 B2* | 7/2015 | Momose | B60H 1/00428 |
| 9,379,420 B2* | 6/2016 | Ketkar | H01M 10/6569 |
| 2003/0201097 A1 | 10/2003 | Zeigler et al. | |
| 2006/0042284 A1 | 3/2006 | Heberle et al. | |
| 2007/0144201 A1* | 6/2007 | Matsumoto | B60H 1/323 |
| | | | 62/335 |
| 2008/0034773 A1 | 2/2008 | Karapetian | |
| 2008/0307813 A1* | 12/2008 | Lifson | F25B 49/022 |
| | | | 700/275 |
| 2009/0132116 A1* | 5/2009 | Tanaka | B60W 10/30 |
| | | | 701/36 |
| 2011/0048042 A1 | 3/2011 | Chen et al. | |
| 2011/0138825 A1 | 6/2011 | Chen et al. | |
| 2011/0209490 A1 | 9/2011 | Mijanovic et al. | |
| 2012/0000222 A1* | 1/2012 | Fink | F25D 29/003 |
| | | | 62/157 |
| 2012/0290161 A1 | 11/2012 | Takeda et al. | |
| 2012/0318014 A1 | 12/2012 | Huff et al. | |
| 2013/0000342 A1 | 1/2013 | Blasko et al. | |
| 2014/0026599 A1 | 1/2014 | Russignuolo et al. | |
| 2014/0157819 A1 | 6/2014 | Koo et al. | |
| 2015/0168032 A1 | 6/2015 | Steele | |
| 2015/0239324 A1 | 8/2015 | Kolda et al. | |

FOREIGN PATENT DOCUMENTS

| | | |
|---|---|---|
| CN | 101681177 A | 3/2010 |
| CN | 102869933 A | 1/2013 |
| CN | 103476613 A | 12/2013 |
| CN | 103890502 A | 6/2014 |
| CN | 104589958 A | 5/2015 |
| CN | 104734631 A | 6/2015 |
| CN | 104884773 A | 9/2015 |
| EP | 0652409 A1 | 5/1995 |
| EP | 1022171 A1 | 7/2000 |
| EP | 2910870 A1 | 8/2015 |
| GB | 2356725 A | 5/2001 |
| JP | 2002096627 A | 4/2002 |
| JP | 2011195065 A | 10/2011 |
| WO | 2012014470 A1 | 2/2012 |
| WO | 2012071159 A1 | 5/2012 |
| WO | 2014045400 A1 | 3/2014 |
| WO | 2014085672 A1 | 6/2014 |
| WO | 2014152349 A1 | 9/2014 |
| WO | 2015114287 A2 | 8/2015 |

OTHER PUBLICATIONS

Search Report regarding related PCT App. No. PCT/US2016/058048; mailed Feb. 1, 2017; 6 pgs.
Written Opinion regarding related PCT App. No. PCT/US2016/058048; mailed Feb. 1, 2017; 6 pgs.
Chinese Office Action for application CN 201680064198.7, dated Dec. 30, 2019, 12 pages.

* cited by examiner

TRANSPORT REFRIGERATION SYSTEM AND METHOD OF OPERATING

CROSS-REFERENCE TO RELATED APPLICATIONS

This application is based on PCT/US2016/058048 filed on Oct. 21, 2016, which claims the benefit of priority to U.S. Provisional Patent Application Ser. No. 62/250,110, filed Nov. 3, 2015, both of which are incorporated herein by reference in their entirety.

BACKGROUND OF THE DISCLOSURE

The embodiments herein generally relate to "all electric" transport refrigeration systems and a method of operating such systems.

Refrigerated trucks and trailers are commonly used to transport perishable cargo, such as, for example, produce, meat, poultry, fish, dairy products, cut flowers, and other fresh or frozen perishable products. A transport refrigeration system is mounted to the truck or to the trailer in operative association with a cargo space defined within the truck or trailer for maintaining a controlled temperature environment within the cargo space.

Conventionally, transport refrigeration systems used in connection with refrigerated trucks and refrigerated trailers include a transport refrigeration unit having a refrigerant compressor, a condenser with one or more associated condenser fans, an expansion device, and an evaporator with one or more associated evaporator fans, which are connected via appropriate refrigerant lines in a closed refrigerant flow circuit. Air or an air/gas mixture is drawn from the interior volume of the cargo space by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo space.

On commercially available transport refrigeration systems used in connection with refrigerated trucks and refrigerated trailers, the compressor, and typically other components of the transport refrigeration unit, must be powered during transit by a prime mover. In the case of refrigerated trailers, the prime mover typically comprises a diesel engine carried on and considered part of the transport refrigeration system. In mechanically driven transport refrigeration systems the compressor is driven by the diesel engine, either through a direct mechanical coupling or a belt drive, and other components, such as the condenser and evaporator fans are belt driven.

An "all electric" transport refrigeration system for a refrigerated trailer application is also commercially available through Carrier Corporation headquartered in Farmington, Connecticut, USA. In the all electric transport refrigeration system, a prime mover, most commonly a diesel engine, carried on and considered part of the transport refrigeration system, drives an AC synchronous generator that generates AC power. The generated AC power is used to power an electric compressor motor for driving the refrigerant compressor of the transport refrigeration unit and also powering electric AC fan motors for driving the condenser and evaporator motors and electric heaters associated with the evaporator. For example, U.S. Pat. No. 6,223,546 discloses an all electric transport refrigeration system.

In some all electric transport refrigeration systems, a single engine may power two or more independent refrigeration units or systems. In such systems, an emphasis must be placed on monitoring and management of the engine operation to sufficiently meet the power demand of the two or more independent refrigeration units. Unfortunately, management is complex, as well as potentially costly and prone to error.

BRIEF DESCRIPTION OF THE DISCLOSURE

According to one embodiment, a method of operating a transport refrigeration system is provided. The method includes electrically powering a first plurality of components of a first refrigeration unit and a second plurality of components of a second refrigeration unit, wherein electrically powering comprises operating a prime mover and an electric generation device. The method also includes monitoring a plurality of operating parameters of the first refrigeration unit. The method further includes monitoring a plurality of operating parameters of the second refrigeration unit. The method yet further includes calculating a combined power load of the first refrigeration unit and the second refrigeration unit. The method also includes comparing the combined power load to a maximum available power of the prime mover.

In addition to one or more of the features described above, or as an alternative, further embodiments may include monitoring an operating speed of the prime mover and comparing the operating speed to a prime mover speed limit.

In addition to one or more of the features described above, or as an alternative, further embodiments may include monitoring a current of the electric generation device and comparing the current to a predetermined current.

In addition to one or more of the features described above, or as an alternative, further embodiments may include taking a corrective action if the combined power load exceeds the maximum available power.

In addition to one or more of the features described above, or as an alternative, further embodiments may include taking a corrective action if the operating speed exceeds the prime mover speed limit.

In addition to one or more of the features described above, or as an alternative, further embodiments may include taking a corrective action if the current exceeds the predetermined current.

In addition to one or more of the features described above, or as an alternative, further embodiments may include that the corrective action includes determining whether the first refrigeration unit or the second refrigeration unit is to be unloaded. Also included is unloading one of the first refrigeration unit and the second refrigeration unit.

In addition to one or more of the features described above, or as an alternative, further embodiments may include that the corrective action comprises opening a bypass valve in fluid communication with a compressor of one of the first refrigeration unit and the second refrigeration unit to reduce a compressor load. The corrective action also includes turning off the first refrigeration unit or the second refrigeration unit.

In addition to one or more of the features described above, or as an alternative, further embodiments may include that determining whether the first or second refrigeration unit is to be unloaded includes calculating a control error of the first refrigeration unit. Also included is calculating a control error of the second refrigeration unit, wherein the control error for each refrigeration unit is defined by the difference between a control temperature and a control set point. Further included is comparing the control error of the first refrigeration unit to the control error of the second refrigeration unit, wherein the refrigeration unit to be unloaded is the refrigeration unit with the lower control error.

In addition to one or more of the features described above, or as an alternative, further embodiments may include that monitoring the operating parameters of the first refrigeration unit and the operating parameters of the second refrigeration unit comprises summing power required for the first plurality of components and the second plurality of components, each of the plurality of components comprising a compressor, a fan and an auxiliary power source.

In addition to one or more of the features described above, or as an alternative, further embodiments may include that the maximum available power of the prime mover is a function of at least atmospheric air temperature and an operating speed of the prime mover.

In addition to one or more of the features described above, or as an alternative, further embodiments may include that the first refrigeration unit and the second refrigeration unit each utilize carbon dioxide as an operating refrigerant.

According to another embodiment, a transport refrigeration system includes a prime mover. Also included is an electric generation device powered by the prime mover and providing an electric output. Further included is a first refrigeration unit electrically powered by the electric output of the electric generation device. Yet further included is a second refrigeration unit electrically powered by the electric output of the electric generation device. Also included is a controller in operative communication with the prime mover, the first refrigeration unit and the second refrigeration unit, the controller calculating a combined power load of the first refrigeration unit and the second refrigeration unit, the controller calculating a maximum available power of the prime mover, wherein the controller compares the combined power load to the maximum available power.

In addition to one or more of the features described above, or as an alternative, further embodiments may include that the controller unloads electric power supply to one of the first refrigeration unit and the second refrigeration unit if the combined power load exceeds the maximum available power.

BRIEF DESCRIPTION OF THE DRAWINGS

The subject matter which is regarded as the disclosure is particularly pointed out and distinctly claimed in the claims at the conclusion of the specification. The foregoing and other features and advantages of the disclosure are apparent from the following detailed description taken in conjunction with the accompanying drawings in which:

DETAILED DESCRIPTION OF THE DISCLOSURE

Figure 1:
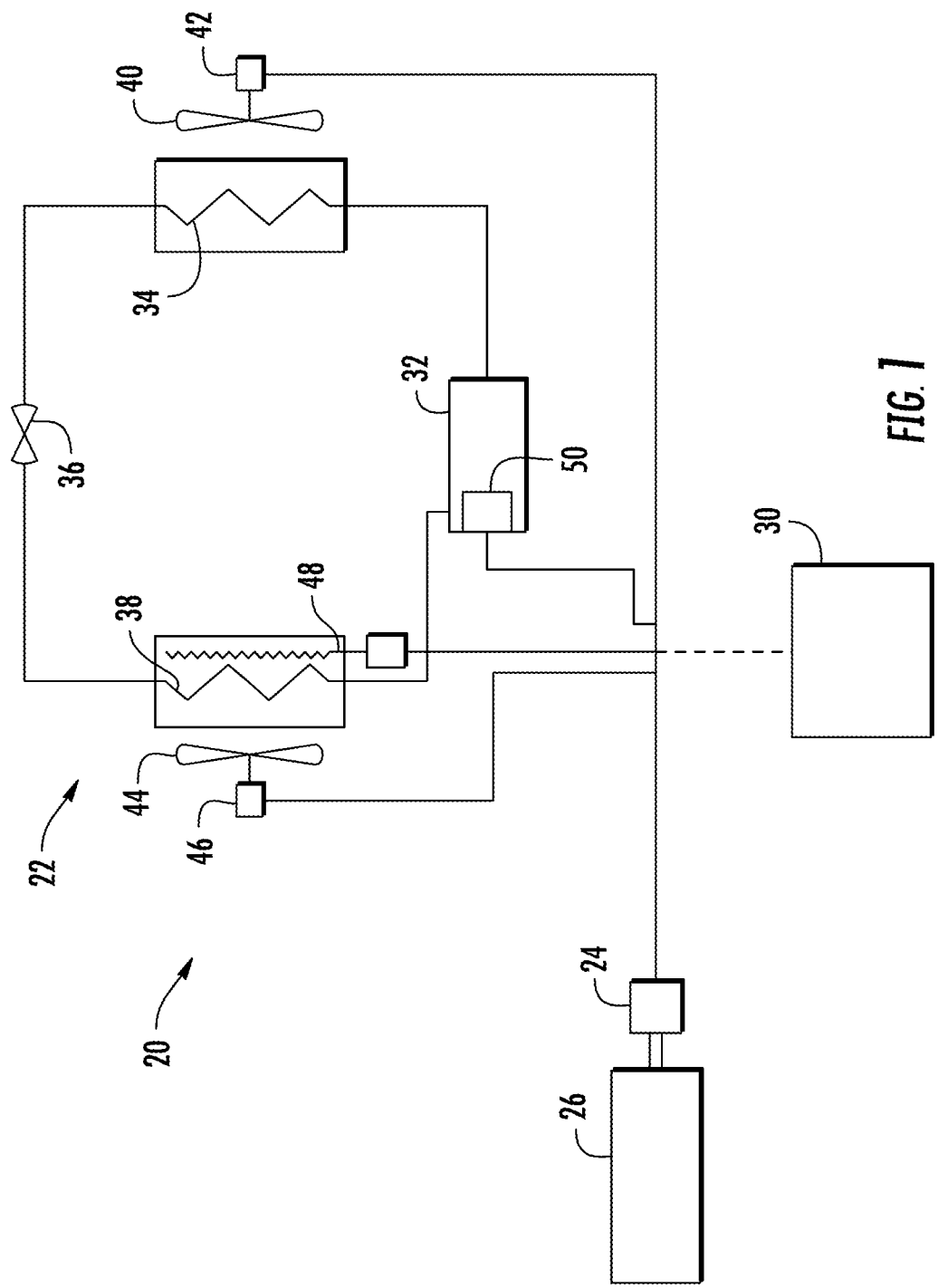
FIG. 1 is a schematic illustration of a transport refrigeration system in accordance with the disclosure.

Referring to FIG. 1, a transport refrigeration system 20 includes a refrigeration unit 22, an electric generating device 24, a prime mover 26 for driving the electric generating device 24, and a controller 30. The refrigeration unit 22 functions, under the control of the controller 30, to establish and regulate a desired product storage temperature within a refrigerated cargo space wherein a perishable product is stored during transport and to maintain the product storage temperature within a specified temperature range. The refrigerated cargo space may be the cargo box of a trailer, a truck, a seaboard shipping container or an intermodal container wherein perishable cargo, such as, for example, produce, meat, poultry, fish, dairy products, cut flowers, and other fresh or frozen perishable products, is stowed for transport.

The transport refrigeration unit 22 includes a refrigerant compression device 32, a refrigerant heat rejection heat exchanger 34, an expansion device 36, and a refrigerant heat absorption heat exchanger 38 connected in refrigerant flow communication in a closed loop refrigerant circuit and arranged in a conventional refrigeration cycle. The refrigeration unit 22 also includes one or more fans 40 associated with the refrigerant heat rejection heat exchanger 34 and driven by fan motor(s) 42 and one or more fans 44 associated with the refrigerant heat absorption heat exchanger 38 and driven by fan motor(s) 46. The refrigeration unit 22 may also include an electric resistance heater 48 associated with the refrigerant heat absorption heat exchanger 38. It is to be understood that other components (not shown) may be incorporated into the refrigerant circuit as desired, including for example, but not limited to, a suction modulation valve, a receiver, a filter/dryer, an economizer circuit.

The refrigerant heat rejection heat exchanger 34 may, for example, comprise one or more refrigerant conveying coiled tubes or one or more tube banks formed of a plurality of refrigerant conveying tubes extending between respective inlet and outlet manifolds. It is noted that round tubes with plate fins or microchannel arrangements may be employed as the refrigerant heat rejection heat exchanger 34. The fan(s) 40 are operative to pass air, typically ambient air, across the tubes of the refrigerant heat rejection heat exchanger 34 to cool refrigerant vapor passing through the tubes. The refrigerant heat rejection heat exchanger 34 may operate either as a refrigerant condenser, such as if the refrigeration unit 22 is operating in a subcritical refrigerant cycle or as a refrigerant gas cooler, such as if the refrigeration unit 22 is operating in a transcritical cycle.

The refrigerant heat absorption heat exchanger 38 may, for example, also comprise one or more refrigerant conveying coiled tubes or one or more tube banks formed of a plurality of refrigerant conveying tubes extending between respective inlet and outlet manifolds. It is noted that round tubes with plate fins or microchannel arrangements may be employed as the heat absorption heat exchanger 38. The fan(s) 44 are operative to pass air drawn from the temperature controlled cargo box across the tubes of the refrigerant heat absorption heat exchanger 38 to heat and evaporate refrigerant liquid passing through the tubes and cool the air. The air cooled in traversing the refrigerant heat rejection heat exchanger 38 is supplied back to the temperature controlled cargo box. It is to be understood that the term "air" when used herein with reference to the atmosphere within the cargo box includes mixtures of air with other gases, such as for example, but not limited to, nitrogen or carbon dioxide, sometimes introduced into a refrigerated cargo box for transport of perishable produce.

The refrigerant compression device 32 may comprise a single-stage or multiple-stage compressor such as, for example, a reciprocating compressor or a scroll compressor. The compression device 32 has a compression mechanism (not shown) driven by an electric motor 50. In an embodiment, the motor 50 may be disposed internally within the compressor with a drive shaft interconnected with a shaft of the compression mechanism, all sealed within a common housing of the compression device 32.

The refrigeration system 20 also includes a controller 30 configured for controlling operation of the refrigeration system 20 including, but not limited to, operation of various components of the refrigerant unit 22 to provide and maintain a desired thermal environment within the cargo box of the truck or trailer, that is within the temperature controlled space in which a perishable product is stowed. The controller 30 may be an electronic controller including a microprocessor and an associated memory bank. The controller 30 controls operation of various components of the refrigerant unit 22, such as the refrigerant compression device 32 and its associated drive motor 50, the fan motors 42, 46 and the electric heater 48. The controller 30 may also be also to selectively operate the engine 26, typically through an electronic engine controller (not shown) operatively associated with the engine 26. The controller also controls valves, such as solenoid valves for unloading the refrigeration unit, or other valves (e.g., "stepper valves") that are used for pressure and superheat control.

The refrigeration unit 22 has a plurality of power demand loads, including, but not limited to, the compression device drive motor 50, the drive motor 42 for the fan 40 associated with the refrigerant heat rejection heat exchanger 34, and the drive motor 46 for the fan 44 associated with the refrigerant heat absorption heat exchanger 38. In the depicted embodiment, the electric resistance heater 48 also constitutes a power demand load. The electric resistance heater may be selectively operated by the controller 30 whenever a control temperature within the temperature controlled cargo box drops below a preset lower temperature limit, which may occur in a cold ambient environment. In such an event the controller 30 would activate the electric resistance heater 48 to heat air circulated over the electric resistance heater by the fan(s) 44 associated with the refrigerant heat absorption heat exchanger.

The prime mover 26, which comprises an on-board fossil-fuel engine, most commonly a Diesel engine, drives the electric generating device 24 that generates electrical power. The drive shaft of the engine drives the shaft of the electric generating device. In an electrically powered embodiment of the transport refrigeration unit 10, the electric generating device 42 may comprise a single on-board, engine driven AC generator configured to generate alternating current (AC) power including at least one AC voltage at one or more frequencies. In an embodiment, the electric generating device 42 may, for example, be a permanent magnet AC generator or a synchronous AC generator. In another embodiment, the electric generating device 42 may comprise a single on-board, engine driven DC generator configured to generate direct current (DC) power at at least one voltage. As each of the fan motors 42, 46 and the compression device drive motor 50 may be an AC motor or a DC motor, it is to be understood that various power converters, such as AC to DC rectifiers, DC to AC inverters, AC to AC voltage/frequency converters, and DC to DC voltage converters, may be employed in connection with the electric generating device 42 as appropriate.

Figure 2:
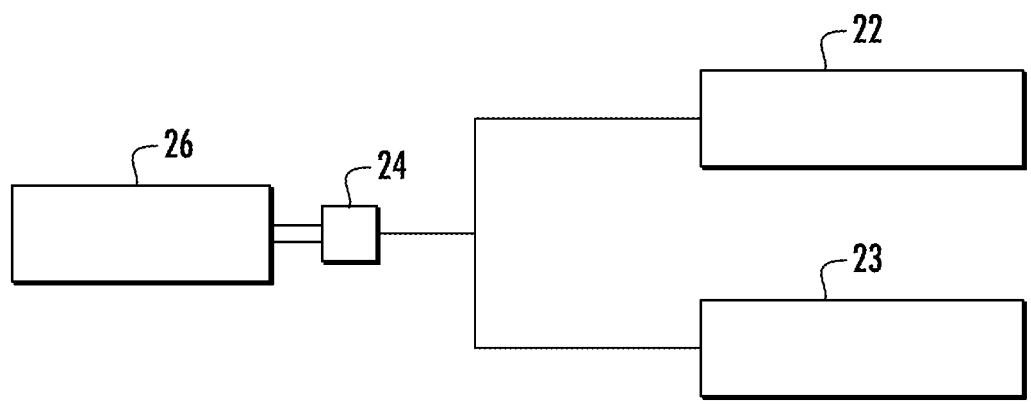
FIG. 2 is a schematic illustration of two independent refrigeration units of the transport refrigeration system.

The description above associated with FIG. 1 describes a first refrigeration unit 22 in detail, including individual devices, components and sub-systems. Referring now to FIG. 2, the prime mover 24 electrically powers two refrigeration units, such as the first refrigeration unit 22 and a second refrigeration unit 23. The second refrigeration unit 23 represents a refrigeration unit that is independent of the first refrigeration unit 22. However, the first and second refrigeration units 22, 23 are associated with temperature management of different refrigeration compartments.

The second refrigeration unit 23 includes similar devices, components and sub-systems as those of the first refrigeration unit 22, such that duplicative illustration of the features shown schematically in FIG. 1 is not necessary. The different units may be responsible for cooling distinct compartments that have different requirements based on size or content. For example, the first refrigeration unit 22 may be responsible for cooling one or more cargo spaces containing products to be frozen, while the second refrigeration unit 23 is responsible for cooling one or more distinct cargo spaces containing products to be refrigerated at a temperature above freezing. These variations may require the two refrigeration units 22, 23 to include distinct devices, components, and sub-systems to carry out the desired operations.

Figure 3:
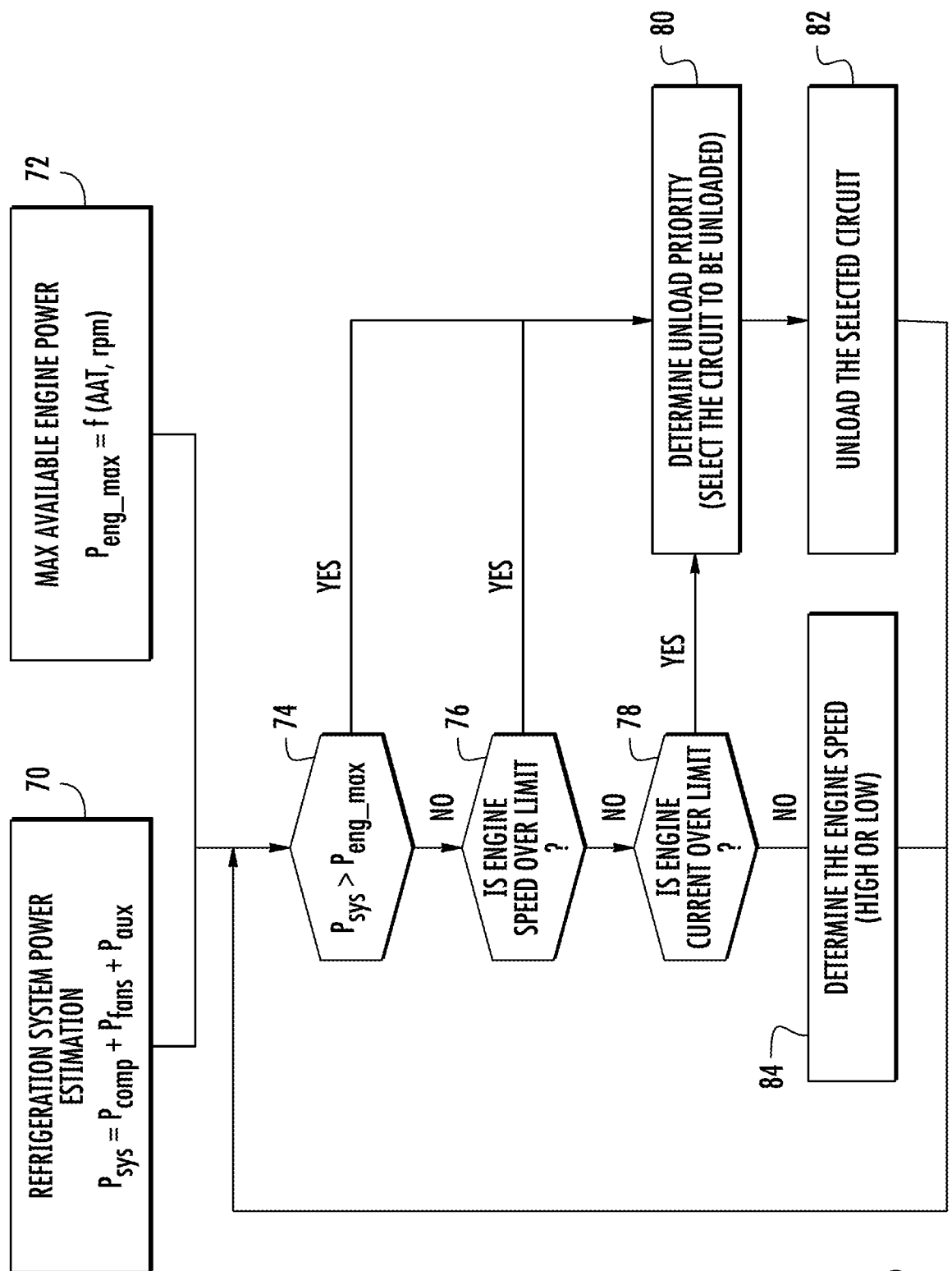
FIG. 3 is a flow diagram illustrating a method of operating a refrigeration system.

Referring now to FIG. 3, a method of operating the transport refrigeration system is illustrated. As described herein, the method relies upon the controller 30 described above for monitoring and calculating processes associated with operating of the transport refrigeration system 20. The method includes electrically powering the first refrigeration unit 22 and the second refrigeration unit 23 with the prime mover 24 and the electric generation device 26, as described in detail above. A plurality of operating parameters and conditions of the first and second refrigeration units 22, 23 are monitored during operation of the transport refrigeration system 20. The monitored parameters are employed to calculate 70 a combined power load of the first and second refrigeration units 22, 23. In particular, the power required for operation by the components of each refrigeration unit is summed to determine the combined power load. The components monitored include the compressor and fan associated with each refrigeration unit, as well as any other components needing power to operate (e.g., heaters). The calculated power load provides a real-time estimation of refrigeration power consumption based on the monitored information.

The method also includes calculating 72 a maximum available power of the prime mover 24 during operation of the transport refrigeration system 20 to provide a real-time estimation of available engine power. The maximum available power is a function of numerous monitored variables, including atmospheric air temperature and operating speed, for example. To ensure that the prime mover 24 is operated within its desired envelope, the combined power load is compared 74 to the maximum available power. If the combined power load does not exceed the maximum available power of the prime mover 24, normal operation is maintained.

In some embodiments, the method includes additional comparisons to determine the operational integrity of the engine. For example, a monitored operational speed of the prime mover 24 is compared 76 to a prime mover speed limit that is programmed in the controller 30. If the monitored operational speed does not exceed the prime mover speed limit, normal operation is maintained. An additional example of a comparison includes comparing 78 a monitored current of the electric generating device 26 to a predetermined current that is programmed in the controller 30. If the monitored current does not exceed the programmed current, normal operation is maintained.

If any of the comparisons reveal an operating condition indicative of the engine operating outside of its envelope, a corrective action is initiated. The corrective action comprises unloading one of the refrigeration units 22, 23.

If unloading is required, the method includes determining 80 which of the first and second refrigeration units 22, 23 to unload. The determination may be made in numerous manners. First, operational experience may dictate which unit to unload. Factors may include the contents of the distinct cargo spaces which are refrigerated by the refrigeration units or whether the cargo space is refrigerated or frozen, for example. Second, a control error may dictate which refrigeration unit is unloaded. A control error for each refrigeration unit 22, 23, is calculated by determining the difference between a control temperature and a control set point. The control temperature refers to a temperature detected by a sensor, thermistor or the like and the control set point refers to a desired temperature for the environment. After comparing the control error for each refrigeration unit, the system unloads the unit with the lower control error. The examples related to the determination of which unit to unload are merely illustrative and are not limiting, as other contemplated factors may play a role in which unit is unloaded. Irrespective of which determination method is employed, the system unloads the selected circuit (i.e., refrigeration unit 22 or 23) 82.

In some embodiments, the corrective action includes opening a bypass valve that is in fluid communication with a compressor of one of the refrigeration units 22, 23. By opening the bypass valve, the compressor load is reduced, thereby reducing the combined power load of the refrigeration units 22, 23. If this step successfully returns the system to operation within the prime mover envelope, no additional corrective actions are required. If this is unsuccessful, or if the corrective action does not include opening a bypass valve, further correction action is to turn off one of refrigeration unit 22, 23.

As represented with numeral 84 in FIG. 3, the prime mover 24 is a two-speed engine in some embodiments and the method includes determining whether the engine is being operated at a high or low speed. Switching the speed of the engine will alter the available power of the engine and may result in more efficient operation.

Advantageously, the system and method described herein provide real-time information about the operational integrity of the system 20. More particularly, overloading of the engine is reliably avoided and engine speed management is greatly enhanced.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A method of operating a transport refrigeration system comprising:
    electrically powering a first plurality of components of a first refrigeration unit including a first compression device and a second plurality of components of a second refrigeration unit including a second compression device, wherein electrically powering comprises operating a prime mover and an electric generation device;
    monitoring a plurality of operating parameters of the first refrigeration unit;
    monitoring a plurality of operating parameters of the second refrigeration unit;
    calculating a combined power load of the first refrigeration unit and the second refrigeration unit; and
    comparing the combined power load to a maximum available power of the prime mover;
    further comprising taking a corrective action in response to the combined power load exceeding the maximum available power;
    wherein the corrective action comprises:
    determining whether the first refrigeration unit or the second refrigeration unit is to be unloaded; and
    unloading one of the first refrigeration unit and the second refrigeration unit;
    wherein determining whether the first or second refrigeration unit is to be unloaded comprises:
    calculating a control error of the first refrigeration unit;
    calculating a control error of the second refrigeration unit, wherein the control error for each refrigeration unit is defined by the difference between a control temperature and a control set point; and
    comparing the control error of the first refrigeration unit to the control error of the second refrigeration unit, wherein the refrigeration unit to be unloaded is the refrigeration unit with the lower control error;
    wherein the maximum available power of the prime mover is calculated from atmospheric air temperature and an operating speed of the prime mover.

2. The method of claim 1, further comprising:
    monitoring an operating speed of the prime mover; and
    comparing the operating speed to a prime mover speed limit.

3. The method of claim 1, further comprising:
    monitoring a current of the electric generation device; and
    comparing the current to a predetermined current.

4. The method of claim 1, wherein the corrective action comprises at least one of:
    opening a bypass valve in fluid communication with one of the first compression device of the first refrigeration unit and the second compression device of the second refrigeration unit to reduce a compression device load; and
    turning off the first refrigeration unit or the second refrigeration unit.

5. The method of claim 1, wherein monitoring the operating parameters of the first refrigeration unit and the operating parameters of the second refrigeration unit comprises summing power required for the first plurality of components and the second plurality of components, each of the plurality of components comprising a fan and an auxiliary power source.

6. The method of claim 1, wherein the first refrigeration unit and the second refrigeration unit each utilize carbon dioxide as an operating refrigerant.

7. A transport refrigeration system comprising:
    a prime mover;
    an electric generation device powered by the prime mover and providing an electric output;
    a first refrigeration unit including a first compression device electrically powered by the electric output of the electric generation device;

a second refrigeration unit including a second compression device electrically powered by the electric output of the electric generation device; and a controller in operative communication with the prime mover, the first refrigeration unit and the second refrigeration unit, the controller calculating a combined power load of the first refrigeration unit and the second refrigeration unit, the controller calculating a maximum available power of the prime mover, wherein the controller compares the combined power load to the maximum available power;

wherein the controller unloads one of the first refrigeration unit and the second refrigeration unit in response to the combined power load exceeding the maximum available power;

wherein determining whether the first or second refrigeration unit is to be unloaded comprises:

calculating a control error of the first refrigeration unit;

calculating a control error of the second refrigeration unit, wherein the control error for each refrigeration unit is defined by the difference between a control temperature and a control set point; and comparing the control error of the first refrigeration unit to the control error of the second refrigeration unit, wherein the refrigeration unit to be unloaded is the refrigeration unit with the lower control error;

wherein the maximum available power of the prime mover is calculated from atmospheric air temperature and an operating speed of the prime mover.

* * * * *